(12) United States Patent
Grolman

(10) Patent No.: US 9,242,218 B2
(45) Date of Patent: Jan. 26, 2016

(54) PROCESS FOR HEAT TREATMENT OF SEMI-CRYSTALLINE POLYMERS

(75) Inventor: Eric Grolman, Maastricht (NL)

(73) Assignee: DSM IP ASSETS B.V., Heerlen (NL)

( * ) Notice: Subject to any disclaimer, the term of this patent is extended or adjusted under 35 U.S.C. 154(b) by 694 days.

(21) Appl. No.: 13/003,654

(22) PCT Filed: Jul. 7, 2009

(86) PCT No.: PCT/EP2009/058607
§ 371 (c)(1),
(2), (4) Date: Jan. 11, 2011

(87) PCT Pub. No.: WO2010/003956
PCT Pub. Date: Jan. 14, 2010

(65) Prior Publication Data
US 2011/0124776 A1 May 26, 2011

(30) Foreign Application Priority Data

Jul. 11, 2008 (EP) .................................. 08160204

(51) Int. Cl.
*C08J 3/00* (2006.01)
*B01J 8/12* (2006.01)
(Continued)

(52) U.S. Cl.
CPC .. *B01J 8/12* (2013.01); *B01J 8/125* (2013.01); *C08G 63/80* (2013.01); *C08G 63/88* (2013.01); *C08G 69/46* (2013.01); *F26B 17/16* (2013.01);
(Continued)

(58) Field of Classification Search
CPC ............. B01J 8/12; C08G 63/80; F26B 17/16
USPC .......................................................... 524/494
See application file for complete search history.

(56) References Cited

U.S. PATENT DOCUMENTS 5,167,274 A 12/1992 Mueller
6,249,989 B1 * 6/2001 Conochie et al. ............... 34/337
(Continued)

FOREIGN PATENT DOCUMENTS

EP 1 785 442 5/2007
EP 1 939 238 7/2008
(Continued)

OTHER PUBLICATIONS

International Search Report for PCT/EP2009/058608, mailed Sep. 2, 2009.
(Continued)

*Primary Examiner* — Ling Choi
*Assistant Examiner* — Lanee Reuther
(74) *Attorney, Agent, or Firm* — Nixon & Vanderhye P.C.

(57) ABSTRACT

The present invention relates to a continuous process for heat treatment of a particulate thermoplastic material comprising a thermoplastic semi-crystalline polymer in the solid state in a single flow-through installation comprising one or more heating zones, wherein each heating zone comprises a contact heater consisting of an array of heating plates, the granulate material is transported as a moving packed bed in the flow-through installation, the process comprises one or more heating steps and in each heating step the particulate material is heated through contact heating via the contact heater, or one of the contact heaters, and optionally a flow of inert gas is applied in one or more heating zones with a mass ratio G/M of at most 2, wherein G is the inert gas flow in kg/hour and M is the particulate material flow in kg/hour.

9 Claims, 2 Drawing Sheets

Figure 1:
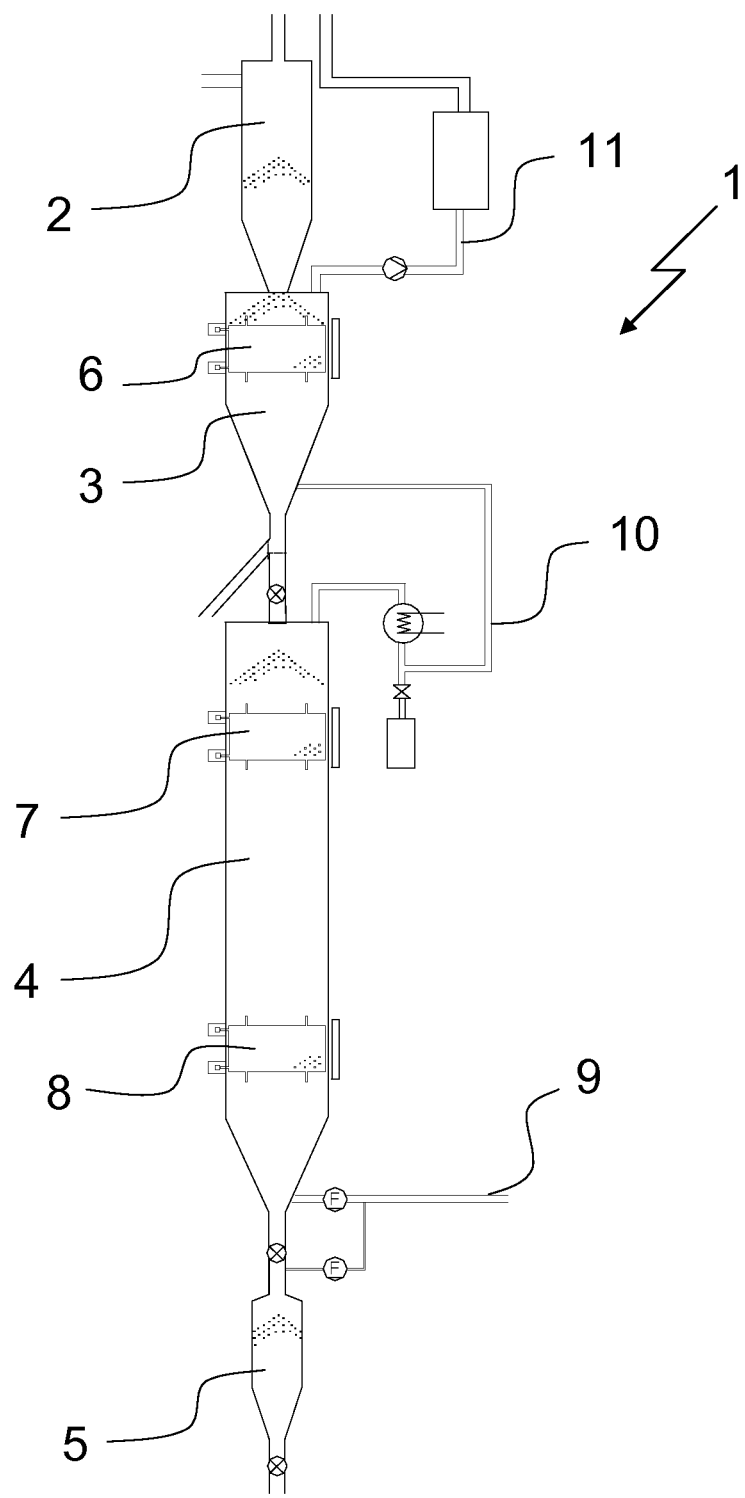

(51) Int. Cl.
*C08G 63/80* (2006.01)
*C08G 63/88* (2006.01)
*C08G 69/46* (2006.01)
*F26B 17/16* (2006.01)
*F26B 21/14* (2006.01)
*F28D 9/00* (2006.01)

(52) U.S. Cl.
CPC .......... *F26B 21/14* (2013.01); *B01J 2208/0015* (2013.01); *B01J 2208/0053* (2013.01); *B01J 2208/00132* (2013.01); *B01J 2219/00033* (2013.01); *B01J 2219/185* (2013.01); *B01J 2219/187* (2013.01); *B01J 2219/1923* (2013.01); *B01J 2219/1946* (2013.01); *F28D 9/00* (2013.01); *F28D 9/0093* (2013.01)

(56) References Cited

U.S. PATENT DOCUMENTS 7,098,300 B1 8/2006 Chen et al.
2002/0026030 A1* 2/2002 Duh .............................. 528/272

FOREIGN PATENT DOCUMENTS

| JP | 1-87821 | 6/1989 |
| JP | 2005-247957 | 9/2005 |
| JP | 2007-327029 | 12/2007 |
| JP | 2012-180827 | 9/2012 |

OTHER PUBLICATIONS

Papaspyrides, C.D. et al, *Solid State Polymerization*, ISBN 978-0-470-08418-2, pp. 236, 239-240, 250 and 271-273 (2009).

* cited by examiner

PROCESS FOR HEAT TREATMENT OF SEMI-CRYSTALLINE POLYMERS

This application is the U.S. national phase of International Application No. PCT/EP2009/058607, filed 7 Jul. 2009, which designated the U.S. and claims priority to EP Application No. 08160204.7, filed 11 Jul. 2008, the entire contents of each of which are hereby incorporated by reference.

The present invention relates to a continuous process for heat treatment of a particulate thermoplastic material comprising a thermoplastic semi-crystalline polymer in the solid state, comprising one or more heating steps.

The said process can also be described as a continuous solid state heat treatment process. Continuous solid state heat treatment processes are applied, for example, for drying, pre-crystallizing, annealing and post condensation, or a combination thereof, of thermoplastic semi-crystalline polymers. Such polymers can have been obtained, for example, from a melt polymerization process or melt compounding process, resulting in polymeric materials comprising, for example, low molecular weight and/or low crystalline polymer.

Continuous solid state heat treatment processes are typically performed in flow-through installations, and generally includes the following steps:
a) feeding the particulate material to the flow-through installation,
b) passing the particulate material through a heating zone while heating the particulate material in the heating zone,
c) optionally maintaining the particulate material at elevated temperature and/or cooling the particulate material while further transporting the particulate material in the flow-through installation,
d) and discharging the particulate material from the flow-through installation.

The term semi-crystalline polymer is herein understood to have the meaning as generally used in the polymer industry: i.e. a polymer that has the ability to form in the solid-state a multiphase structure, being at least a two-phase structure, one phase being an amorphous phase and one phase being a crystalline phase. Such a thermoplastic semi-crystalline polymer may initially have in the solid state a single, amorphous phase. The amorphous phase is characterized by a glass transition temperature (Tg). The amorphous semi-crystalline polymer can be crystallized in part by heat treatment in the solid state to become a thermoplastic polymer having a crystalline phase next to an amorphous phase. The crystalline phase in such a semi-crystalline polymer with a two-phase or multi-phase structure is characterized by a melt temperature (Tm) and a crystallization temperature (Tc). The melting temperature (Tm) can be observed when the semi-crystalline polymer has a crystalline phase. The melting temperature will typically be observed after solid state heat treatment of the particulate thermoplastic material and may be observed already prior to the heat treatment depending on the initial state of the particulate thermoplastic material.

With the term "in the solid state" is herein understood that during the whole process the thermoplastic semi-crystalline polymer is kept in the solid state and implicates that the temperatures attained by the particulate thermoplastic material during the heat treatment remain below the melting temperature (Tm) of the thermoplastic semi-crystalline polymer. With the term melting temperature (Tm) is herein understood the temperature, measured on the particulate material as fed to the flow-through installation, according to ASTM D3417-971D3418-97 by DSC during the first heating cycle with a heating rate of 10° C./min, falling in the melting range and showing the highest melting rate.

In general terms, the heat treatment processes described in the state of the art can be discriminated depending on how the particulate material is transported in the flow-through installation, either as moving packed bed, or as a fluidized bed, or sequential combinations thereof. Heating is generally performed by use of hot inert gas, or a combination of hot inert gas and contact heating. Generally, large volumes of inert gas are involved, which are often at least partly recycled.

As described in the state of the art, during the development and design of continuous solid state heat treatment processes for thermoplastic semi-crystalline polymers such as polyester and polyamides, different problems are encountered, including uniformity and efficiency of the heating, fast heating of the granulate material while preventing overheating, prevention of sticking, in particular for low crystalline material, dust formation, removal of condensation products and other volatile components released from the heated granulate material, purification and recycling of inert gas used for the heating, up-scaling of lab scale experiments, wear of equipment, etc.

For example, in EP-A-717 061 the problem of inert gas flow in the polycondensation reaction step is discussed. According to the teaching of that reference an inert gas flows co- or counter-currently with the direction of the flow of the polymer particles in the solid-state post condensation, to remove the volatile products formed during the solid-state post condensation step. The gas is recycled after removal of by-products. In order to limit the purification cost of gas recycling and the energy for the maintenance of the gaseous flow the weight ratio between the gas flow rate and the polymer flow rate should be low. According to EP-A-717 061 even a ratio below 0.6 will lead to a polyethylene terephthalate having the required properties. But EP-A-717 061 itself is silent with respect to the crystallization step and refers regarding this step to the teaching of EP-A-712 703. Therein a crystallization step is described whereby the amorphous material is first heated in a fluidized bed by a gas stream of sufficient velocity to maintain fluidization. Thereafter, the material is subjected to mechanical mixing for further crystallization. Furthermore, EP-A-712 703 discloses that the gas used for the fluidization is sent together with gas coming from the polycondensation step to a purification unit. Consequently large volumes of inert gas have to be used and purified according to the process described in EP-A-717 061. Furthermore, two mechanical mixing steps are necessary which is expensive in terms of investment costs and additional energy and maintenance costs.

WO 2006/021118 relates to a process for the production of a high-molecular polycondensate comprising a heating step, a crystallization step, a solid-state post condensation step, and a cooling step, whereby gas is used in the cooling unit and heat is transferred from the particulate material to the gas and the such heated gas is used to heat the material in the heater. Hence, this reference is also particularly concerned with the heat integration of the entire process. WO 2006/021118 also describes that in the crystallization step a polymer granulate has to be heated whereby several options are disclosed, like contact heating, radiation heating and by a heated gas flow. But it is described as essential that during the crystallization step the polymer particles are maintained in movement relative to each other which can be achieved by stirring, by a rotating vessel for the crystallization step or by creating a fluidized bed by heating with inert gas. Using mechanical means, like a stirrer or a moving vessel in order to create relative movement of the particles, will lead to increased wear of the equipment, increased wear of the product and dust formation as well as to increased investment cost and energy cost for introduction of additional mechanical energy into the system. Using a heated inert gas flow for heating and creating a fluidized bed, again, requires, as discussed above with respect to the other prior art references, processing, especially purification of high volume gas streams which also increases the cost of the process.

U.S. Pat. No. 3,756,990 describes a continuous SSPC process for polyesters, which involves moving of the polyester as a coherent or fixed granular bed and treating the polyesters in two heating zones, the first zone comprising heating and crystallizing, the second zone comprising further heating and after condensation, also known as post condensation. The heating medium may consist solely of inert gas or may be a combination of indirect jacket heating and the use of an inert gas. In the first zone large amounts of hot inert gas have to be used to achieve rapid heating, while preventing overheating and turbulence of the granulated polyester in that heating zone. The initial granulate or precondensate has an average degree of crystallization or crystallinity of 5%, preferably between 30 and 50%, to prevent sticking at the temperature at which the after condensation is performed. In the second zone the gas stream can be limited, and is for example 2.9 kg/hr versus a granulate material flow of 2.5 hr.

US-A-2005/0065315 discloses a process for pre-crystallization and solid-state post condensation of polyethylene terephthalate (PET) and deals with recovery of thermal energy. In the process of US-A-2005/0065315 the heat of hot polyester material after leaving the solid-state post condensation step is used to preheat cold amorphous particulate polyester material from a storage silo before it enters the crystallization step. The heat exchange is claimed to be achieved by different embodiments. According to a first embodiment the hot pellets leaving the solid-state post condensation step are contacted in a cooler with a cooling gas and then the heated gas is directed to a pellet heater wherein the amorphous material coming from the storage silo is heated with said gas prior to entry into the crystallizer. The gas leaving the pellet heater is still warm and may be optionally further cooled. Thus the energy recovery is far from optimal and further heating of the granulate prior to entry into or in the crystallizer will still be necessary. Pipes are used for transport from the heat exchanger to the crystallizer, and the granulate pellets are transferred by a gas stream through the pipes, optionally as a fluidized bed. According to an alternative embodiment the hot pellets after the solid-state post condensation step and the cool pellets from the storage silo are both fed to a contact heat exchanger with different partitions. The materials may flow co-current or countercurrent. Upward flow may be assisted by a stream of gas. A disadvantage of this stream of gas is that it dilutes the material flow, absorbs energy and will prevent an efficient energy transfer to the other material stream. On the other hand, as is stated in US-A-2005/0065315, if the packing density of the downward flowing pellets is high, it is preferred for the heating of the pellets before introduction to the crystallizer, to maintain the pellets in a fluidized or agitated state by passage of gas through the pellets in an upward direction. For efficient heat transfer the contact heat exchanger with different partitions may require many partitions, making the construction complex and difficult to clean, and complicates feeding of the separate material streams. Furthermore, co-current flow will not lead to full exchange of the thermal energy and further heating or cooling of the pellets will be necessary. Although this reference relates to an improved heat integration it does not provide any teaching on how heating in the crystallization step and in the solid-state post condensation step can be performed in an efficient manner, while limiting the amount of nitrogen gas.

In view of the above, there is still a need for an improved continuous process for heat treatment of a particulate thermoplastic material comprising a thermoplastic semi-crystalline polymer in the solid state that allows for efficiently heating of the particulate material, whilst preventing overheating of particulate material and limiting the amount of inert gas.

According to the present invention there is provided a process, which is carried out in a flow-through installation comprising one or more heating zones, wherein each heating zone comprises a contact heater consisting of an array of heating plates,
the particulate material is fed to the flow-through installation;
the granulate material is transported in the heating zone, or in the heating zones, essentially as a moving packed bed;
the particulate material is discharged from the flow-through installation;
the particulate material is heated by energy input coming for at least 70% from the contact heater, or, in case of more than one contact heater, from the contact heaters;
optionally a flow of inert gas is applied in one or more of the heating zones, wherein the flow of inert gas in each heating zone, if any, complies with a mass ratio G/M of at most 2, wherein G is the inert gas flow in kg/hour and M is the particulate material flow in kg/hour.

The effects of the process according to the invention, wherein the heat treatment is performed in a flow-through apparatus wherein the particulate material is primarily heated by contact heating via a contact heater, include that an efficient heat transfer is accomplished, use and requirement of excessive inert gas volumes is avoided, the process is efficient in energy use, and overheating and sticking of the particulate material can easily be avoided. Overheating in the heating zone or heating zones, is simply avoided by limiting the temperature of the heating plates of the contact heater. Where necessary to avoid overheating in a first step, where further heating is required, the heating zone can be split by using multiple contact heaters sequentially arranged in order of increasing temperature. To allow the material to remain longer at a certain temperature before being heated further, the sequentially arranged contact heaters can simply be spaced over a longer distance within the flow-through installation. Despite that the temperature of the heating plates of the contact heater might thus have to be limited, the heat transfer is efficiently accomplished by adjusting the length of the heating zone and the length of the heating plates of the contact heater, the distance between the heating plates and the mass flow of the particulate material. A large mass flow of particulate material can be compensated by using a heating zone with a larger diameter and the increasing the number of heating plates. A small material mass flow can also be balanced with a low inert gas flow, without loosing the efficiency of the heat transfer. An installation according to the invention has a much larger effective turn-down ratio (ratio between minimum and maximum applicable solids flow rates) than conventional installations, because it is not bound by a minimum gas flow rate for fluidization, gas recovery or heating. The very low solids velocity and the absence of mechanical agitation, significantly reduce dust formation compared to conventional processes. The low inert gas flow has the advantages that costs for inert gas and inert gas recycling are low, while also loss of energy during gas recycling or purge of inert gas is low. The inert gas flow though being low is sufficient to allow for the removal of the volatile products released during the heat treatment. The moving packed bed is advantageous for uniform heating of the granulate material, and is well retained since the low inert gas flow is far from sufficient to create fluidization of the particles and also mechanical stirring between the heater plates is inhibited. Nevertheless, by limiting the temperature of the heating plates in critical processes, such as in the pre-crystallization phase of polyesters, thereby preventing overheating, the particular material is also prevented from sticking. Construction of the contact heater from heating plates allows for a good flow of the particulate material through the heating zone and easy cleaning of the heating zone. A further advantage of the whole heat treatment process according to the invention, even when comprising multiple heating steps, is that it can be accomplished without the need of large gas streams for transferring the particulate material via pipes or otherwise from one process unit to another, while abrasion and energy losses are reduced. Furthermore, the process installation is relatively simple and the process can be scaled up more easily, compared to the processes according to the prior art described above.

The term "essentially" in the sentence "the granulate material is transported . . . essentially as a moving packed bed" is herein understood to mean that the granulate material is not transported in the flow-through installation by fluidization, that the granulate material is transported as a moving packed bed in areas and zones where that is possible, such as in areas and zones where no narrowings or expansions occur and the regularly ordered arrangement and relative positions of the particles of the particulate material in respect of each other can be maintained while moving through that zone, while in areas and zones within the flow-through installation, wherein narrowings or expansions occur, such as necks, transitions in diameter, irregularities in distances between the plates, transitions from open zones to heating zones and from heating zones to open zones, the particles are forced to change their relative positions and to seek a new ordering in order to allow further moving within the flow-through installations through such narrowings or expansions.

With the expression that "the particulate material is heated by energy input coming for at least 70% from the contact heater, or, in case of more than one contact heater, from the contact heaters" it is not intended that the heating may occur by energy input coming from a contact heater being transferred to the particulate material via a gas stream, or from hot particulate material via a gas stream to colder particulate material. For example, cool gas supplied at the gas entrance may absorb heat from a hot contact heater or hot particles relatively close to the gas entrance and transfer heat to cooler particles further away from the gas entrance and downstream relative to the gas flow direction in the flow-through installation. The energy input for the contact heater may come from any external source, such as electrical heating or heating by oil.

The process according to the invention suitably comprises a drying step, a pre-crystallizing step, an annealing step or a post condensation step, or any combination thereof, i.e. the process is used for drying, pre-crystallizing, annealing or post condensation, or a combination thereof, of the particulate thermoplastic material comprising the thermoplastic semi-crystalline polymer while being retained in the solid state.

Preferably, G/M (the ratio of inert gas flow [kg/hour]/particulate material mass flow [kg/hour]) in the process according to the invention is at most 1.5, more preferably at most 1.0, 0.8, or even 0.6. In particular cases, such as with glass-filled thermoplastic materials, the ratio can be even lower, e.g. around or even below 0.3. A lower G/M ratio makes the process even more economical due to lower costs of the nitrogen gas and less energy loss.

The process according to the invention is suitably carried out in a flow-through installation comprising an elongated vertically positioned vessel with feed means for the granular material at its upper end and discharge means at its lower end and including a unidimensionally narrowing discharge zone.

The apparatus may, other than vertically, be positioned with an inclination angle, as long as the granular material is capable of flowing as a moving packed bed, optionally with help of bin-activation to prevent bridging. Preferably, the inclination angle is less than 30°, more preferably less than 15°, or even less than 5°. Herein the inclination angle is measured relative to the vertical position. Preferably the apparatus is vertically positioned. A smaller inclination angle allows the material to move more exclusively or even solely on account of gravity. Thus, wear of the equipment is reduced to a minimum and investment costs and energy costs are low.

The heating plates suitably are planar or essentially so. The apparatus includes at least one heating zone occupied by a contact heater comprising a plurality of planar heat exchange elements. The heating plates are preferably positioned vertically, or essentially so, or inclined like the whole apparatus, and are regularly spaced from one another and distributed uniformly over the heating zone. This construction and arrangement allows for a stabilized flow of the granular material in the thermal treatment zone and uniform heating of the granular material.

The heating plates are regularly spaced from one another. Whereas too large a plate-to-plate distance may lead to inhomogeneous and or insufficient heating of the particulate material, and too small a plate-to-plate distance may lead to bridging, depending on the type of material and size of the granulate particles. It has been observed that the plate-to-plate distance can suitably be in the range of 1-12 cm. Preferably the plate-to-plate distance is at most 10 cm, more preferably at most 8 cm, or even at most 6 cm. With a smaller plate-to-plate distance the heating of the granular material is even more uniform. The plate-to-plate distance preferably is at least 1.5 cm, more preferably at least 1.8 cm. A larger plate-to-plate distance allows for a better flow of the granulate material and easier cleaning between the plates. A plate-to-plate distance of 2.0-3.0 has been observed to be very suitable for the process according to the invention.

Preferably, the ratio between the plate-to-plate distance and the average particle size of the particulate material and the average particle size of the particulate material is in the range of 4-50, preferably 10-25.

Herein the average particle size of the particulate material is established by measuring the average volume of the particles and considering a sphere of the same volume. The diameter of this sphere is taken to be the average particle diameter (size) of the particles. The average volume can suitably be established by weighing 100 particles and dividing this weight by 100 times the density of the polymer, or any other suitable technique. For very elongated particles, i.e. with aspect ratios above 5, the ratio of distance to particle size is preferably in the range of 20-200.

The apparatus advantageously comprises at least two heating zones each comprising a contact heater as described above, wherein the contact heaters being positioned in longitudinal succession. The advantage is that the granulate material is easily transferred from one heating zone to a subsequent heating zone and can be heated stepwise in a controlled manner.

The apparatus also advantageously comprises at least one cooling zone comprising a cooling element comprising a plurality of planar heat exchange elements as described above for the contact heater. The cooling element may suitably be positioned in longitudinal succession relative to the contact heaters.

The apparatus further advantageously comprises gas inlets and gas outlets positioned in alternation with the contact heater, and/or between the contact heaters, and optionally the cooling element.

In order to prevent cooling of the granulate material near the vicinity of the walls of the vessel, the apparatus may be equipped with a heating jacket or with wall segments comprising a heating jacket. Alternatively, the apparatus may be insulated, optionally assisted by electrical or other tracing to further prevent cooling of the granulate near the walls.

The apparatus may also include an air-tight storage chamber arranged below the discharge zone for further cooling and/or temporary retention of the thermally treated granular material and to act as a gate to prevent oxygen from leaking into the system.

The elongated vertically positioned vessel preferably has heating zones with an essentially rectangular cross-section. This allows the heating zone to be regularly filled with heating plates having the same dimensions, and also allows the distance or spacing between the heating plates to be adjusted easily without having to exchange heating plates of different dimensions. Likewise the discharge section comprises a unidimensionally narrowing essentially rectangular discharge zone.

The cross-section being intended to be rectangular or essentially so, is intended to be the cross section perpendicular to the elongation direction of the elongated vessel.

The term "essentially" in "essentially rectangular cross-section" means that the heating zones has 4 peripheric walls, 2 of which running more or less parallel to the heating plates in that heating zone and 2 of which running more or less perpendicular to those heating walls. The 4 wall do not need to be exactly perpendicular relative to each other to allow the heating zone to be regularly filled with heating plates having the same dimensions. As an example, the cross-section of the heating zone may be deformed into a skewed shape such as that of a parallelogram, in which heating zone the heating plates having the same dimensions are slightly displaced relative to each other, in order to regularly fill the heating zone with heating plates.

Likewise, the term "essentially rectangular" in "essentially rectangular discharge zone" means that the discharge zone has 4 peripheric walls, which, as is expressed by "unidimensionally narrowing" converge to each other in the direction of a discharge opening. The cross-section of the 4-walls does not need to be exactly rectangular, as for the 4 walls of the heating zones. The cross-section of the discharge zone being essentially rectangular is intended to be the cross section perpendicular to the elongation direction of the elongated vessel.

In case the flow-through installation has more than one heating zone, it may well comprise a slot in between different heating zones. The slot may be used for example to separate a gas stream in one heating zone from a gas stream from another heating zone. The slot may be part of a neck, i.e. a part of the flow-through installation having a smaller cross section than the cross-section of the heating zone.

Likewise, both the heating zones and the neck have a circular cross-section and the neck and heating zones are connected with conical sections.

A possible alternatively, is that the heating zones have a rectangular cross-section, while the neck has a more circle like cross-section, but the neck may also have a rectangular cross-section instead.

The apparatus comprising heating zones with a rectangular cross-section, advantageously comprises one or more doors or removable wall segments facing towards a contact heater in a wall perpendicular to the plates of the contact heater. The presence of such a door or removable wall segment has the advantage of easier cleaning, inspection and maintenance of the contact heater.

Thermoplastic semi-crystalline polymers that can be subjected to the continuous solid state heat treatment process according to the invention include thermoplastic semi-crystalline polyesters and thermoplastic semi-crystalline polyamides. Typically, as known in the art, semi-crystalline polyester resins are prepared by polycondensation of starting materials comprising diols and dicarboxylic acids, and/or ester derivatives thereof, whereas semi-crystalline polyamide resins are prepared by polycondensation of starting materials comprising diamines and dicarboxylic acids, and/or aminocarboxylic acids and/or cyclic derivatives thereof. Generally, such polymers are prepared in two steps, first a melt polymerization to obtain a prepolymer, and second a solid state postcondensation (SSPC) to obtain a polymer having a higher molecular weight compared to the prepolymer.

For briefness and compactness of the description a particulate thermoplastic material comprising a thermoplastic semi-crystalline polyester resin will also be denoted as particulate polyester material. Analogously a particulate thermoplastic material comprising a thermoplastic semi-crystalline polyamide resin will also be denoted as particulate polyamide material.

The process according to the invention is not limited to prepolymer obtained from a melt polymerization process that first need a pre-crystallization step. The process can be applied to any polymer or prepolymer that needs a heat treatment in the solid state. The process can be advantageously applied, for example, for prepolymers, that first need a drying step and subsequently a post condensation step. By performing the process according to the invention in an apparatus comprising two heating zones comprising a contact heater, the drying can be accomplished in the first step and the post condensation in the second step in one continuous process, with elimination of sticking of the particulate material.

In a preferred embodiment, the particulate materials comprises a granulated polyamide prepolymer obtained from a process comprising a prepolymerization step and a granulation step, wherein one or both of these steps are carried out in water or under moist conditions.

In a preferred embodiment of the invention the thermoplastic semi-crystalline polymer is a nascent polymer, more preferably a nascent thermoplastic semi-crystalline polyester and/or a nascent thermoplastic semi-crystalline polyamide. With the term nascent polymer is understood a polymer that is obtained from a melt polymerization process, or comprised in a polymer composition obtained from a melt compounding process, which polymer or composition, after being subjected to the melt process, is cooled, solidified and granulated without further being subjected to a heating step. Typically, the nascent polymer has a predominantly amorphous structure with a low degree of crystallinity. More preferably, the nascent polymer is a nascent thermoplastic semi-crystalline polyester. Such a polymer typically has a very low degree of crystallinity. Such granulated material comprising the nascent polymer is advantageously used in the process according to the invention comprising a pre-crystallisation step while presenting reduced sticking problems compared to conventional processes involving large volumes of gas.

The thermoplastic semi-crystalline polyester resin suitably is an aliphatic semi-crystalline polyester, a semi-aromatic semi-crystalline polyester, or a aromatic semi-crystalline polyester. These polyesters are derived respectively from aliphatic diols and aliphatic dicarboxylic acids, from aliphatic diols and aromatic dicarboxylic acids and/or aromatic diols and aliphatic dicarboxylic acids, and from aromatic diols and aromatic dicarboxylic acids.

Suitable semi-aromatic thermoplastic polyester resins that can be comprised in the process according to the invention are, for example poly(alkylene terephthalate)s, poly(alkylene naphthalate)s, and poly(alkylene bibenzoate)s, and any copolymers and/or mixtures thereof.

Aliphatic and cycloaliphatic diols and aromatic diacids such as terephthalic acid can be used. Examples of poly (alkylene terephthalate)s constituted of aliphatic diols with 2-12 carbon atoms and terephthalic acid as the aromatic diacid are poly(ethylene terephthalate) PET, poly(trimethylene terephthalate) PTT, and poly(1,4-butylene terephthalate) PBT. An example of a poly(cycloaliphatic terephthalate) is poly(1,4-cyclohexylenedimethylene terephthalate).

Poly(alkylene naphthalate)s are polyesters derived from 2,6-naphthalenedicarboxylic acid and short chain diols. Suitable poly(alkylene naphthalate)s are poly(ethylene naphthalate) (PEN) and poly(buthylene naphthalate) (PBN).

Poly(alkylene bibenzoate)s can be derived for example from 4,4'-diphenyldicarboxylic acid and short chain diols such as ethylene glycol and/or butane diole. Suitable examples are poly(ethylene bibenzoate) (PEBB) and poly (butylenes bibenzoate) (PBBB).

A special class of semi-crystalline polyesters is formed by polyesters containing hard segments derivable from semi-aromatic polyester prepolymers comprising short chain ester units, and soft segments derivable from polymeric diols. This class of polyesters is denoted herein as semi-aromatic block co-polyester elastomer, and includes polyether ester elastomers and polyester ester elastomers. Depending on the amount of long chain diol in such polyester, the material can be a stiff but tough plastic or a flexible thermoplastic elastomer. Said polyesters and their preparation are for example described in 'Encyclopedia of polymer science and technology', Vol. 12, John Wiley &Sons, New York, 1988 (ISBN 0-471-80944-6).

Suitably, the hard segments comprise poly-ethylene terephthalate and/or poly-butylene terephthalate. Also suitably, the long chain diols are derived from poly(alkylene oxide) diols, aliphatic polyester diols and/or aliphatic polycarbonate diols. Suitably, the blockcopolyester has a hardness in the range of about 25-75 Shore D; preferably about 35-70 Shore D. This hardness can be controlled by the amount of long chain diol in the blockcopolyester.

Preferably, the particulate thermoplastic semi-crystalline polyester resin containing material comprises a semi-aromatic polyester and/or a semi-aromatic co-polyester elastomer.

More preferably, the particulate thermoplastic semi-crystalline polyester resin-containing material comprises a semi-aromatic polyester selected from the group consisting of PET, PTT and PBT, and mixtures and copolymers thereof.

The particulate material used in the process according to the invention may fully consist of the thermoplastic semi-crystalline polymer, or may consist of a composition comprising the thermoplastic semi-crystalline polymer next to one or more other components. Such compositions are often prepared by a melt-compounding process.

In a preferred embodiment of the invention the particulate material comprises next to the thermoplastic semi-crystalline polymer at least one additive, i.e. a component different form the thermoplastic semi-crystalline polymer. Other components that can be suitably comprised by the particulate material are fillers, reinforcing agents and other auxiliary additives. The particulate material may comprise one or more additives in a total amount varying over a large range. The total amount may be as low as 0.1 wt %, or even lower, and also as high as 70 wt %, or even higher, wherein the wt. % is relative to the total weight of the particulate material. Very suitably, the particulate material comprises one or more additives in a total amount of 1-60 wt %, even more suitably 5-50 wt % or even 10-40 wt %.

Preferably, the particulate material comprises a fibrous reinforcing agent and/or an inorganic filler, more preferably the reinforcing agent comprises glass fibres. Preferably, the particulate material comprises glass fibers in an amount of at least 5 wt %, more preferably at least 20 wt %, and even more preferably in an amount of 30-50 wt %, relative to the total weight of the particulate material. Surprisingly, it was found that reinforcing agents and fillers are remarkably effective in reducing the sticking potential of semi-crystalline polyesters, such as nascent semi-crystalline polyesters, which would otherwise stick together strongly in conventional heat treatment processes.

Auxiliary additives that may be present include stabilizers, processing aids, colouring agents and pigments, flame retardants, and nucleating agents, which later are also known as crystallization enhancers. Preferably the particulate material comprises a nucleating agent.

In a preferred embodiment, the particulate material comprises a semi-aromatic polyester selected from PET, PET-copolymers, PBT and PBT-copolymers and mixtures and copolymers thereof, filled with inorganic fillers and/or reinforcing agents.

More preferably, the particulate material comprises polyethylene terephthalate and 10 to 60 wt % of reinforcing agent, relative to the total weight of particulate material. Preferably the amount of reinforcing agent is 20-50 wt % or even 30-40 wt %. Also preferably the reinforcing agent comprises glass fibers.

Furthermore, the PET comprised in this preferred particulate material preferably consisting for 0-20 wt % of a crystalline phase at the point of entry to the apparatus, the wt % being relative to the weight of the PET.

The process according to the invention may comprise multiple heating steps, in each of which heating steps the particulate material is heated as according to the invention, i.e. wherein the particulate material is heated for at least 90% through contact heating via a contact heater. Optionally the heating steps are combined with or alternated with transfer steps wherein the particulate material is transferred to a heating zone, or from one heating zone to another heating zone, or from a heating zone to a cooling zone, or from a heating zone or cooling zone to a discharge unit. Herein all heating, cooling and/or transfer steps to complete the whole heat treatment process are carried out in the flow-through apparatus and the particulate material is maintained as a moving packed bed, until the particulate material is being discharged from the flow-through installation or until a neck is encountered, after which a moving packed bed is re-established.

In a preferred embodiment of the invention, the process is carried out in a flow-through installation comprising at least two heating zones comprising a contact heater consisting of an array of heating plates, and the process comprises at least two heating steps. Suitably the two heating steps comprise a pre-crystallization and/or drying step in combination with a post-condensation and/or annealing step.

More preferably the process is a solid state post condensation (SSPC) process comprising at least two heating steps wherein the granulate material is first pre-crystallized and/or pre-dried and subsequently post-condensed. A pre-crystallization step will be most suitable for polyesters materials, in particular PET materials, whereas a pre-drying step will be most suitable for polyamide materials. In the pre-crystallization step (A), the thermoplastic semi-crystalline polymer is at least partly crystallized, or further crystallized, whereas in the post-condensation step (B) the degree of polymerization is increased, i.e. the molecular weight of the polymer is increased. This embodiment has the advantage that thermoplastic semi-crystalline polymer is post-condensed while stickiness of the particulate material is avoided in one single process cycle.

The granulated material in said process preferably consists of a polymer composition comprising a nascent thermoplastic semi-crystalline polymer and inorganic filler and/or reinforcing fibres. This has the advantage that granulated material can be heated in the first heating step to a higher temperature without the risk of sticking.

According to a preferred embodiment of the present invention in the first heating zone a temperature gradient is applied on the contact heater such that the temperature increases within the zone in flow direction of the material. The advantage thereof is that sticking and blocking problems with even more critical nascent polymers are avoided or further minimized, likewise due to crystallization starting at lower temperature and/or the moisture level decreasing at low temperature, whereas the crystallization proceeds more gradually while further increasing the temperature. Furthermore, while in the flow direction the degree of crystallinity of the material in the moving packed bed further increases and the moisture level decreases, and the material being less susceptible to sticking or blocking phenomena, the temperature in flow direction to finalize the crystallization process can be increased.

Therefore, a person skilled in the art has sufficient possibilities to optimize the crystallization step (A) in terms of temperature, temperature profile, and residence time, depending on the selected material, to achieve the desired non-sticking behavior for the subsequent polycondensation step (B), thereby minimizing or even fully eliminating sticking and blocking effects.

Due to the fact that temperature and residence time in the crystallization step (A), as well the required degree of crystallization necessary for sufficient stickiness reduction for the solid-state post condensation step highly depend on the selected material, as explained above, only rough guidelines can be given for the temperature and residence time to be used in the crystallization step (A).

Thus, in one embodiment of the present invention the contact heater in the first heating zone (A), more particular the pre-crystallization zone, has a highest temperature $T_A$ and the contact heater in the second heating zone (B), more particular the SSPC zone has a highest temperature $T_B$, wherein $T_A$ is at least 20° C., preferably at least 40° C. and most preferred at least 60° C. below $T_B$.

Furthermore, the temperature $T_A$ in the first heating zone may be within the range of 100° C. to 180° C., preferably 110° C. to 160° C., and most preferably 120-140° C. The temperature $T_B$ may be as low as 160° C. or even lower, or as high as 300° C., or even higher, and preferably is in the range of 180° C.-280° C., 200° C.-260° C., 220° C.-240° C. It is noted that $T_B$ has to remain below the melting temperature $T_m$ of the thermoplastic semi-crystalline polymer. Suitably $T_B$ is at least 10° C. below $T_m$, more preferably at least 20° C. or even at least 30° C. below $T_m$.

The residence time in the first heating zone is preferably between 15 minutes and 20 hours, more preferably between 30 minutes and 10 hours and most preferably between 1 hour and 5 hours.

As mentioned above, according to the present invention no inert gas flow in the crystallization step (A) is necessary for heating the polyester material. However, since, especially at higher temperatures, volatile components already diffuse out of the polymer during the crystallization step (A) it is preferred to provide a small inert gas stream through the moving packed bed. Such a small gas stream is also advantageously applied to remove residual moisture and oxygen and to prevent discoloration of the polymer. The velocity in this gas stream is typically much smaller than the minimum velocity associated with fluidization. Suitably, the velocity in this gas stream is between 5 and 1000 times smaller than the minimum velocity associated with fluidization, and more preferably between 10 and 1000 times smaller than the minimum velocity associated with fluidization. The minimum velocity associated with fluidization can be determined by the person skilled in the art of processing particle flows by standard procedures and routine experiments. Further, particulate material and gas may flow co-currently or counter-currently through the first heating zone. With the particulate material and the gas flowing co-currently through the first heating zone, the risk of condensation of volatiles onto the cold feed of particulate material is reduced.

Nevertheless, a counter-current flow of inert gas is also possible, provided the gas flow is maintained below the minimum velocity associated with fluidization and the moving packed bed remains essentially undisturbed by the gas stream. Very low inert gas volumes are fully sufficient. Thus, the mass flow ratio ($G_A$/M) of inert gas [kg/hour] to material [kg/hour] in the first heating zone can be adjusted to be 0 to 2, preferably 0.01 to 1 and most preferred 0.1 to 0.5.

The essentially non-sticky, free flowing particulate material obtained from the crystallization step (A) in the first heating zone is then transferred to a second heating zone where the condensation of the polymer resin takes place in order to increase the molecular weight. Like in the first heating zone the heat required for the SSPC is provided to the particulate material by contact to at least one contact heater to achieve a highest temperature $T_B$ in the second heating zone being within the range of 140° C. up to a temperature closely to and somewhat below the melting temperature of the polymer, $T_m$. Preferably, the highest temperature $T_B$ in the second heating zone is within a range of 95° C. to 5° C., preferably 75° C. to 15° C., most preferably 55° C. to 25° C., below the melting temperature of the crystalline phase of the semi-crystalline polymer. A preferred range is from 160° C. up to a temperature 10° C. below $T_m$, a more preferred range is from 180° C. to a temperature 20° C. below $T_m$. For a particulate material comprising PET the highest temperature $T_B$ in the second heating zone suitably is the range of 160° C. to 250° C., preferably 180° C. to 240° C., most preferably 200° C. to 230° C.

The preferred temperature ranges for a particulate material with another thermoplastic semi-crystalline polymer having a lower or higher melting temperature than PET, the preferred ranges for the temperature $T_B$ in the second heating zone can accordingly be shifted to lower or higher temperature ranges.

With the term melting temperature is herein understood the temperature, measured by DSC with a heating rate of 10° C./min, falling in the melting range and showing the highest melting rate. With the term crystallization temperature is herein understood the temperature, measured by DSC with a cooling rate of 10° C./min, falling in the crystallization range and showing the highest crystallization rate. With the term glass transition temperature is herein understood to be the temperature, measured by DSC with a heating rate of 10° C./min, falling in the glass transition range and showing the highest glass transition rate.

As discussed above, the particulate material is also maintained in the second heating zone as a moving packed bed. In principle, it is possible to conduct also the SSPC step (B) without an inert gas flow, but due to the fact that during SSPC volatile compounds are formed, it is highly preferred to have a flow of inert gas through the second heating zone to remove the volatile material formed during the SSPC to achieve the desired product properties. Because gas flow is not necessary for heating the material, since heating is primarily done by contact heating, the mass flow of inert gas can be maintained low and only has to be sufficient to effectively remove volatile products formed during SSPC. The inert gas flow in the second heating zone can be co-currently with the flow of material or counter-currently, whereby counter-current flow is preferred.

Preferably the mass flow ratio ($G_B/M$) of inert gas flow [kg/hour] to material flow [kg/hour] in the second heating zone is 0 to 1.5, more preferred 0.2 to 1.0, and particularly preferred 0.3 to 0.8.

Taking into account the particularly low volumes of inert gas flow that can possibly be used in the process of the present invention the inert gas can be released into the environment after appropriate purification in order to achieve the required environmental standard, without re-circulation into the system, and need to invest in recirculation process equipment. This is particularly preferred if a low cost source for inert gas is available, thus further reducing the investment cost and operating cost for the process according to the present invention.

Inert gas is herein understood to be a nitrogen containing gas with low oxygen content, suitably below 0.2 wt. %, preferably below 0.1 wt. %. More preferably the inert gas is nitrogen comprising less than 50 ppm, even more preferably less than 20 ppm oxygen, relative to the total weight of the inert gas. Nitrogen is the particularly preferred inert gas for the crystallization step (A) and the SSPC step (B).

For the crystallization step (A) and/or the SSPC step (B), and/or the third zone if present, it is preferred to use a plurality of heat exchange surfaces. Suitably, the heat exchanger comprising a plurality of heat exchange surfaces is a plate heat exchanger comprising a plurality of heating or cooling plates.

According to a preferred embodiment of the present invention the particulate material leaving the second heating zone after SSPC step (B) is fed to a cooling zone where the material is cooled. Cooling might be achieved by heat exchange surfaces, as discussed above for the crystallization step (A) and SSPC step (B) including the preferred embodiments and/or by directing a cool gas flow over the hot particulate material in the cooling step. If an inert gas stream is used for cooling it is preferred that this stream is counter-current to the flow of material, so that the inert gas can be preheated in the cooling step before it enters the second heating zone where the SSPC step (B) takes place. Of course, in such an embodiment the inert gas stream is then adjusted to meet the above described limits for the inert gas stream in the SSPC step (B).

The required degree of crystallinity after completion of the crystallization step (A) and before entering the solid-state post condensation step (B) will, of course, depend on the selected material. However, this can easily be verified by routine experimentation by a person skilled in the art.

Nevertheless, as a rough general guideline, for a semi-crystalline polyester the degree of crystallinity of the non-sticking semi-crystalline material obtained in step (A) before entering the second zone is preferably at least 20 wt. %, more preferably at least 30 wt. %, relative to the weight of the semi-crystalline polyester.

Although the granulate material that is used in the process according to the invention may comprise a wide range of semi-crystalline polymers including nascent polymers implicitly having a low initial degree of crystallinity, it is preferred to start with a material that has a low sticking potential. As a result of all the investigations by the inventors of the present invention a method has been developed by which the sticking potential can be pre-assessed.

The sticking of a particulate material can be related to the energy needed to penetrate a compressed pellet bed of the said material. The sticking potential of a particulate material is herein defined as the increment in the integral penetration energy after a defined heat treatment under defined pressure compared to integral penetration energy treatment under the same pressure treatment without heat being applied.

Preferably, the particulate material used in the process according to the invention has a low sticking potential characterized by an integral penetration energy increment of less than 1 Joule, as determined by the test method described herein further below.

This integral penetration energy increment is a good measure of the amount of caking (sticking) that has taken place in the granulate material. It also discriminates between materials that can be processed without and materials that need to be processed with some sort of mechanical, pneumatic or hydraulic (air) agitation to prevent clogging while transferring the particulate material.

The extra integral energy to penetrate is preferably below 0.8 Joule, and most preferred below 0.5 Joule. The advantage of the particulate material with a lower average extra integral penetration energy is that the particulate material is even more suited for the process according to the invention.

The invention also relates to an apparatus for solid state post condensation of particulate thermoplastic material comprising a thermoplastic semi-crystalline polymer. The apparatus according to the invention is a flow-through installation comprising a feed section, a discharge section and at least two heating zones positioned between the feed section and the discharge section, and wherein each heating zone comprises a contact heater comprising a plurality of planar heat exchange elements regularly spaced from one another and distributed uniformly over the said heating zone.

Examples of different and preferred embodiments of the flow-through installation are described further herein above, in connection with the process wherein the flow-through installation can be used. Specific embodiments are those wherein each heating zone is confined by 4 walls constituting an essentially rectangular cross-section, and wherein the flow trough installation comprises one or more doors or removable wall segments facing towards a contact heater in a wall essentially perpendicular to the plates of the contact heater.

The apparatus according to the invention may be modified according to one or more of the preferred embodiments described herein further above.

In a preferred embodiment of the invention the apparatus comprises at least two heating zones having essentially rectangular or circular cross-sections intermittently interrupted by narrowing and widening sections containing valves and/or other auxiliary equipment, such as a bypass or a sieve.

Whereas in the process according to the invention the starting material is fed to a top section of the apparatus, and the product is removed from a bottom section of the apparatus, and the material is transferred as a packed moving bed primarily by gravity within the apparatus, optionally intermitted by or more necks, the apparatuses may be completed with auxiliary equipment, like feeder, piping, pumps, as is needed for the feeding and discharging of he material.

FIG. 1: schematic drawing of an embodiment of the apparatus according to the invention.

Figure 2:
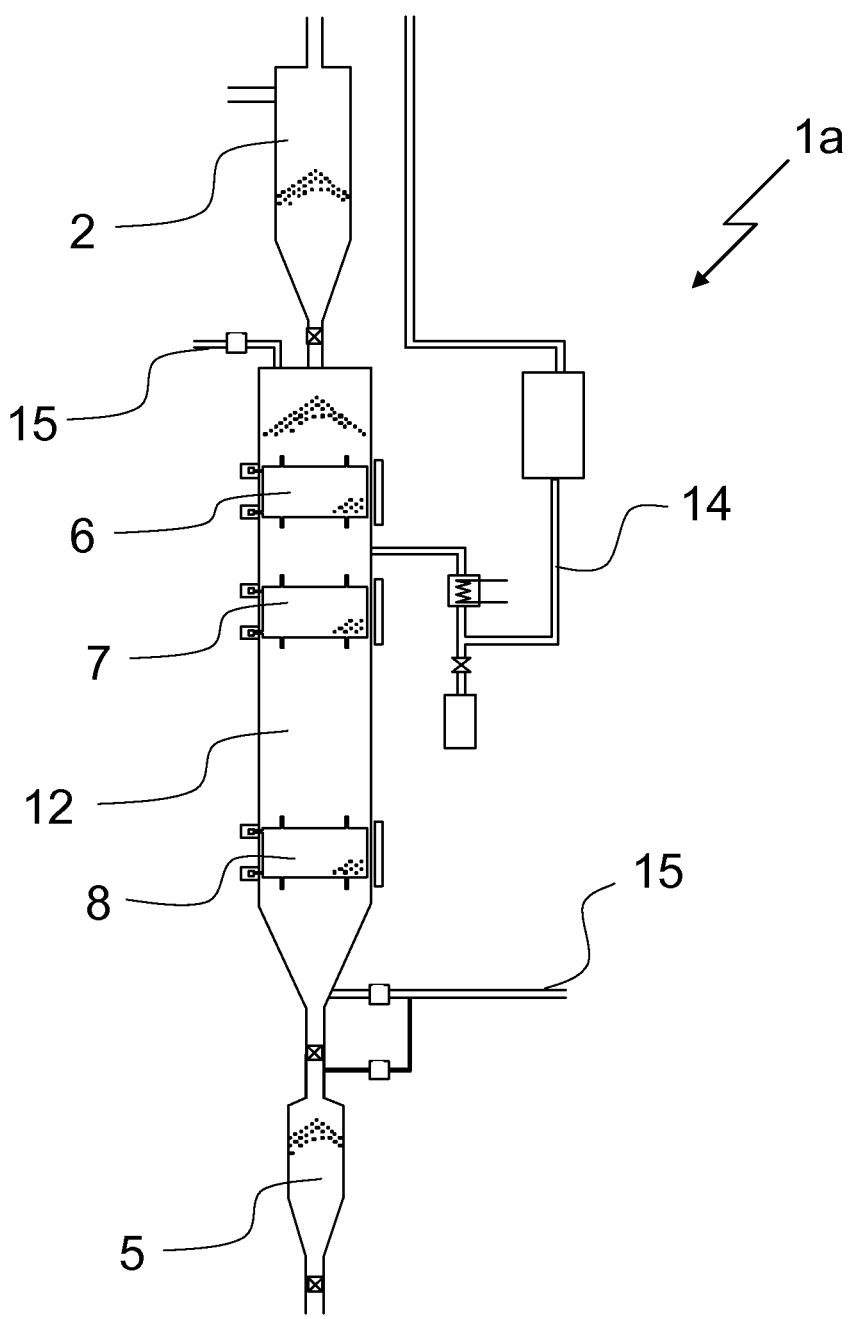

FIG. 2: schematic drawing of another embodiment of the apparatus according to the invention.

FIG. 1 shows a schematic drawing of an embodiment of the apparatus according to the invention for solid state post condensation (SSPC) of a particulate thermoplastic material. The apparatus is a flow-through installation (1) comprising a feed section (2), a discharge section (5) and two intermediate sections (3, 4) with heating zones (6, 7) positioned between the feed section and the discharge section. The second section (4) further comprises a cooling zone (8). The heating zones (6, 7) comprise each a contact heater comprising a plurality of planar heat exchange elements regularly spaced from one another and distributed uniformly over the said heating zone. The contact heaters are suitably fitted with an inlet and an outlet connected to an oil supply unit (not shown) for heating of the heat exchange elements with oil. The cooling zone (8) comprises a cooling unit comprising a plurality of planar heat exchange elements as described above for the contact heater. The cooling unit is suitably fitted with an inlet and an outlet connected to a cooling liquid supply unit for cooling of the heat exchange elements with the cooling liquid. The various sections are equipped with auxiliary equipment (9, 10, 11) such as inlets, outlets and piping, and further auxiliary equipment, such as condenser, collection reservoir, and gas scrubber, for inert gas to be flown through the sections. The installation is meant to be position vertically, with the feeding section on top, thereby allowing the particulate thermoplastic material to flow down by gravitational forces only. The inert gas suitably flows upwardly, i.e. counter-currently to the flow of the particulate thermoplastic material.

FIG. 2 shows a schematic drawing of another embodiment of the apparatus according to the invention for solid state post condensation (SSPC) of a particulate thermoplastic material. The apparatus is a flow-through installation (1a) comprising a feed section (2), a discharge section (5) and one intermediate sections (12) with two heating zones (6, 7) and one cooling zone (8). The heating zones (6, 7) comprise each a contact heater comprising a plurality of planar heat exchange elements regularly spaced from one another and distributed uniformly over the said heating zone. The contact heaters are suitably fitted with an inlet and an outlet connected to an oil supply unit (not shown) for heating of the heat exchange elements with oil. The cooling zone (8) comprises a cooling unit comprising a plurality of planar heat exchange elements as described above for the contact heater. The cooling unit is suitably fitted with an inlet and an outlet connected to a cooling liquid supply unit for cooling of the heat exchange elements with the cooling liquid. The intermediate section is equipped with auxiliary equipment (13, 14, 15) such as inlets, outlets and piping, and further auxiliary equipment, such as condenser, collection reservoir, and gas scrubber, for inert gas to be flown through the sections. The installation is meant to be position vertically, with the feeding section on top, thereby allowing the particulate thermoplastic material to flow down by gravitational forces only. The inert gas suitably flows upwardly, i.e. counter-currently to the flow of the particulate thermoplastic material.

The invention is further illustrated with the following examples and experiments.

Flow-Through Unit

The tests were performed in apparatus essentially characterized as an elongated vertically positioned vessel of rectangular cross-section with feed means for the granular material at its upper end and discharge means at its lower end and including a unidimensionally narrowing rectangular discharge zone. The heating zone comprised heating plates with adjustable spacings. The plates were 600 mm high and 300 mm wide. The plates were double walled plates heated with oil and controlled by a Lauda thermal oil unit.

Tests in the Flow-Through Unit

Several experiments were performed to determine the clogging and bridging behavior of the glass-filled polyester by filling the flow-through unit with the granulated material and subsequently feeding additional granulated material to the flow-through unit meanwhile passing the granulated material as a moving fixed bed through the flow-through unit thereby passing along the heated plates. The polymer in the products typically had a relative viscosity, measured at 1% concentration in methacresol at 25° C., of 1.45. The granules entered the installation from the top, at room temperature. In doing so, the most critical phase of the process, i.e. the crystallization step, was studied. For this purpose the materials were inspected visually. The crystallization of the granules was visible by a slight change in color. Furthermore, the experiments were followed visually through a plexiglass front-plate to study the flow behavior of the product in time.

Plate spacings were adjusted between 18 and 30 mm and temperatures of the plates were varied from room temperature to 145° C. It was observed that close to and at the latter temperature, more particular in the temperature range of 140-145° C., the polyester resin readily crystallizes. Subsequently the feeding and discharge rate were adjusted such that residence time of the granulated material between the heated plates varied from 30 minutes to 2 hours. In a typical experiment, the distance between the outer surface of the plates was set at 22 mm. The flow of granules was adjusted so that the residence time between the plates was 1 hour. Hot oil with a temperature of 142° C. was flowing into the hollow space inside the plates from the bottom. The measured temperature of the oil flowing out of the top of the plates was 141° C. (countercurrent flow). The measured temperature of the pellets at the bottom end of the heat exchanger plates was 142° C. Longer residence times were simulated overnight, with standstill situations leaving the material to sit at elevated temperatures for 8 hours and longer. Surprisingly, none of these experiments showed clogging or formation of lumps for any of the granulated materials. Also the flow behaviour of heat treated and crystallized products did not show any visible difference with that of the fresh products. For these particular experiments, no gas flow was applied, although some temperature gradient driven natural circulation (convection) may have occurred.

Post Condensation

After the crystallization step, the product flowed further down by gravity to the post-condensation section fitted with a plate heat exchanger, where the product attained an even distribution across the plates of the plate heat exchanger. While moving down along the heating plates, the product was heated by contact with the plates, having a set temperature of 220° C., slowly attaining post-condensation temperature. The length of the plates was such that the product leaving the heat exchanger had a temperature difference of at most 1° C. between the material in contact with one of the plates and the material right in the middle between plates. Nitrogen gas flowed through the heating zone counter-currently with the product. After the heating zone, the product slowly moved downwardly through the reaction zone, with nitrogen flowing counter-currently, thereby removing volatile reaction products. After leaving the reaction zone, the product entered a cooling zone comprising a bank of cooling plates. Here the product was cooled to 50° C. by heat exchange with the cooling plates. After this cooling zone, the product was discharged via a unidimensionally narrowing cone and a discharge rotary valve into a buffering vessel.

The product thus obtained consisted of lump free, free flowing granules, and the polymer contained therein had a relative viscosity, measured at 1% concentration in metha-cresol at 25° C., of 1.82.

The invention claimed is:

1. A continuous heat treatment process for heat treatment of a particulate thermoplastic material comprising a thermoplastic semi-crystalline polymer in a solid state, the process comprising:
   (a) carrying out one or more heating steps in a flow-through installation comprising one or more heating zones, wherein each heating zone comprises a contact heater consisting of an array of heating plates;
   (b) feeding the particulate material to the flow-through installation;
   (c) transporting the granulate material in the one or more zones as a non-fluidized moving packed bed in the absence of mechanical agitation;
   (d) discharging the particulate material from the flow-through installation;
   (e) heating the particulate material by energy input coming at least 70% from the contact heater associated with each heating zone; and optionally
   (f) applying a flow of inert gas in one or more of the heating zones, wherein the flow of inert gas in the one or more heating zones, if any, complies with a mass ratio G/M of at most 2, wherein G is inert gas flow in kg/hour and M is particulate material flow in kg/hour.

2. The process according to claim 1, wherein the heat treatment process comprises at least one step selected from the group consisting of a drying step, a pre-crystallizing step, an annealing step and a post condensation step.

3. The process according to claim 1, wherein the mass ratio G/M in the one or more heating zones is at most 1.5.

4. The process according to claim 1, wherein the particulate thermoplastic material comprises a thermoplastic semi-crystalline polyester and/or a thermoplastic semi-crystalline polyamide.

5. The process according to claim 1, wherein the particulate material comprises a fibrous reinforcing agent and/or an inorganic filler.

6. The process according to claim 1, comprising at least two heating steps including a first heating step wherein the granulate material is pre-crystallized and a second heating step wherein the granulate material is post-condensed in the solid state.

7. The process according to claim 1, wherein the mass ratio G/M in the one or more heating zones is at most 1.0.

8. The process according to claim 1, wherein the mass ratio G/M in the one or more heating zones is at most 0.8.

9. The process according to claim 1, wherein the mass ratio G/M in the one or more heating zones is at most 0.6.

* * * * *